United States Patent
Uchino et al.

(10) Patent No.: US 10,064,108 B2
(45) Date of Patent: Aug. 28, 2018

(54) HANDOVER METHOD AND RADIO BASE STATION

(71) Applicant: NTT DOCOMO, INC., Tokyo (JP)

(72) Inventors: Tooru Uchino, Tokyo (JP); Hideaki Takahashi, Tokyo (JP); Satoshi Nagata, Tokyo (JP); Wuri Andarmawanti Hapsari, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/787,888

(22) PCT Filed: Apr. 30, 2014

(86) PCT No.: PCT/JP2014/061979
§ 371 (c)(1),
(2) Date: Oct. 29, 2015

(87) PCT Pub. No.: WO2014/181742
PCT Pub. Date: Nov. 13, 2014

(65) Prior Publication Data
US 2016/0088528 A1    Mar. 24, 2016

(30) Foreign Application Priority Data

May 9, 2013   (JP) ................................. 2013-099358

(51) Int. Cl.
*H04W 36/04*   (2009.01)
*H04W 36/00*   (2009.01)
*H04W 92/20*   (2009.01)

(52) U.S. Cl.
CPC ....... *H04W 36/0055* (2013.01); *H04W 36/04* (2013.01); *H04W 92/20* (2013.01)

(58) Field of Classification Search
USPC ........................................................ 370/331
See application file for complete search history.

(56) References Cited

U.S. PATENT DOCUMENTS

| | | | | | |
|---|---|---|---|---|---|
| 2001/0017850 | A1* | 8/2001 | Kalliokulju | ........... | H04L 69/324 370/331 |
| 2001/0030965 | A1* | 10/2001 | Tourunen | .............. | H04L 1/1657 370/394 |

(Continued)

FOREIGN PATENT DOCUMENTS

JP    2010-536264 A    11/2010
JP    2012-531103 A    12/2012

(Continued)

OTHER PUBLICATIONS

International Search Report issued in corresponding application No. PCT/JP2014/061979 dated Jul. 15, 2014 (2 pages).

(Continued)

*Primary Examiner* — Edan Orgad
*Assistant Examiner* — Emmanuel Maglo
(74) *Attorney, Agent, or Firm* — Osha Liang LLP (57) ABSTRACT

In a handover procedure between cells under different radio base stations (eNB), "RRC diversity" is implemented while considering conditions in a PDCP layer and an RLC layer. A handover method of the invention includes the steps of: causing a radio base station (eNB #1) to transmit to a radio base station (eNB #10), information necessary for generating PDCP-PDU and RLC-PDU; causing the radio base station (eNB #10) to transmit to the radio base station (eNB), "HO ack" including "HO command"; and causing each of the radio base station (eNB #1) and the radio base station (eNB #10) to generate the RLC-PDU including the PDCP-PDU containing the "HO command" based on the information and to transmit the RLC-PDU to a mobile station (UE).

2 Claims, 6 Drawing Sheets

(56) References Cited

U.S. PATENT DOCUMENTS

| | | | | |
|---|---|---|---|---|
| 2004/0042491 A1* | 3/2004 | Sarkkinen | ............. | H04L 1/1642 |
| | | | | 370/469 |
| 2008/0095116 A1* | 4/2008 | Kim | ...................... | H04L 1/1841 |
| | | | | 370/331 |
| 2009/0042573 A1* | 2/2009 | Vedantham | ........... | H04W 36/24 |
| | | | | 455/436 |
| 2013/0148490 A1* | 6/2013 | Yi | .......................... | H04B 7/155 |
| | | | | 370/216 |
| 2014/0056243 A1* | 2/2014 | Pelletier | ................ | H04W 74/04 |
| | | | | 370/329 |

FOREIGN PATENT DOCUMENTS

| | | | |
|---|---|---|---|
| WO | 2009/021074 A1 | 2/2009 | |
| WO | 2010/147974 A1 | 12/2010 | |
| WO | 2011/155256 A1 | 12/2011 | |

OTHER PUBLICATIONS

Written Opinion issued in corresponding application No. PCT/JP2014/061979 dated Jul. 15, 2014 (4 pages).
Ericsson et al.; "Enhancing mobility robustness and offloading potential with RRC diversity"; 3GPP TSG RAN WG2 R2-131211, Chicago, USA; Apr. 15-19, 2013 (8 pages).
Broadcom Corporation; "Architectures for dual connectivity"; 3GPP TSG RAN WG2 Meeting #81bis, R2-130989, Chicago USA; Apr. 15-19, 2013 (12 pages).

* cited by examiner

CASE OF INTER-eNB HANDOVER

HANDOVER METHOD AND RADIO BASE STATION

TECHNICAL FIELD

The present invention relates to a handover method and a radio base station.

BACKGROUND ART

In LTE (Long Term Evolution), when a mobile station UE in "RRC Connected state" moves across a cell boundary, a handover procedure is to take place in order to cause the mobile station UE to perform communication always by using an appropriate cell.

Figure 5:
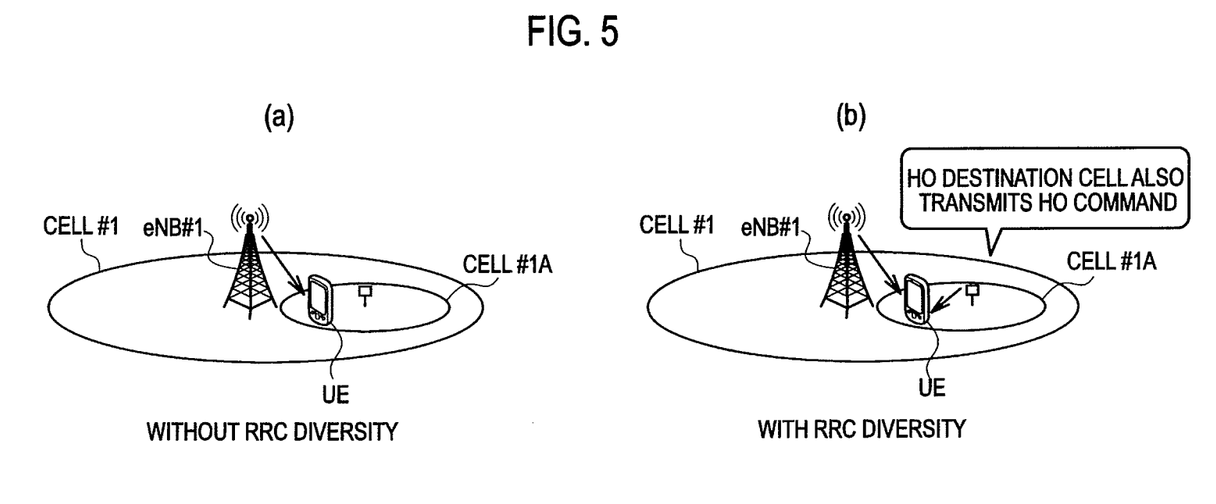
FIG. 5(a) is a view for explaining the related art.
FIG. 5(b) is a view for explaining the related art.

However, when the handover procedure takes place between cells using the same frequency, there is a concern that the mobile station UE cannot receive "HO command" from a handover source cell due to interference from a neighboring cell, and the handover procedure ends up in failure (see FIG. 5(a)).

Accordingly, as shown in FIG. 5(b), there has been proposed a control method (RRC diversity) for transmitting the "HO command" not only from the handover source cell but also from a handover destination cell in order to improve a probability of reception of the "HO command" by the mobile station UE, thus to suppress a failure in the handover procedure (see Non-patent Document 1).

Here, the "RRC diversity" can be implemented by CoMP transmission-reception (Coordinated Multi-Point transmission-reception) on a downlink.

Note that the CoMP transmission-reception on the downlink is a technique for improving throughput on the downlink by transmitting either the same or different data from multiple TPs (Transmission Points) to the mobile station UE.

PRIOR ART DOCUMENT

Non-Patent Document

Non-patent document 1: 3GPP Written Contributions R2-131211

SUMMARY OF THE INVENTION

At present, the CoMP transmission-reception on the downlink can be carried out only in the cells under the same radio base station eNB.

Figure 6:
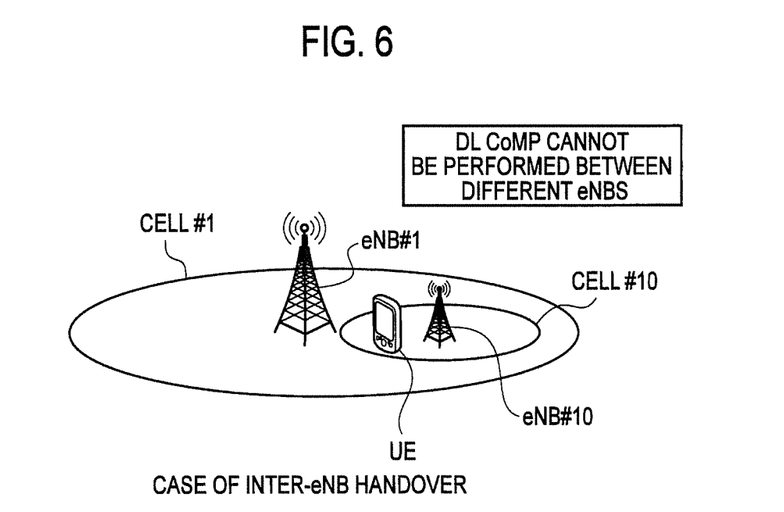
FIG. 6 is a view for explaining the related art.

Accordingly, there is a problem that the "RRC diversity" cannot be implemented in a handover procedure between cells under different radio base stations eNB as shown in FIG. 6.

Meanwhile, "Ciphering" and "Integrity Protection" using a COUNT value (PDCP-SN) are carried out in a PDCP (Packet Data Convergence Protocol) layer. For this reason, both the different radio base stations eNB mentioned above have to transmit identical PDCP-PDU to the mobile station UE.

In addition, sequence control is carried out in accordance with RLC-SN in an RLC (Radio Link Control) layer. For this reason, both the different radio base stations eNB mentioned above have to transmit identical RLC-PDU to the mobile station UE.

However, the conventional LTE method does not consider the above-mentioned conditions in the PDCP layer and the RLC layer in implementing the "RRC diversity," and therefore has a problem that it is not possible to implement the "RRC diversity" in the handover procedure between the cells under different radio base stations eNB.

The present invention has been made in view of the aforementioned problem. An object of the present invention is to provide a handover method and a radio base station which are capable of implementing "RRC diversity" in a handover procedure between cells under different radio base stations eNB, while considering conditions in a PDCP layer and an RLC layer.

A first feature of the present invention is summarized as a handover method of performing a handover of a mobile station connected to a first cell under a first radio base station, to a second cell under a second radio base station, including the steps of: causing the first radio base station to transmit to the second radio base station, information necessary for generating PDCP-PDU and RLC-PDU; causing the second radio base station to transmit to the first radio base station, a handover acknowledgment signal including a handover instruction signal; and causing each of the first radio base station and the second radio base station to generate the RLC-PDU including the PDCP-PDU containing the handover instruction signal based on the information, and to transmit the RLC-PDU to the mobile station.

A second feature of the present invention is summarized as a radio base station operable as a second radio base station when a mobile station connected to a first cell under a first radio base station is subjected to a handover to a second cell under the second radio base station, including: a reception unit configured to acquire information necessary for generating PDCP-PDU and RLC-PDU from the first radio base station; and a transmission unit configured to generate the RLC-PDU including the PDCP-PDU containing a handover instruction signal based on the information, and to transmit the RLC-PDU to the mobile station.

A third feature of the present invention is summarized as a mobile communication method to be performed when a mobile station connected to a first cell under a first radio base station is subjected to a handover to a second cell under a second radio base station, including the steps of: causing the second radio base station to transmit to the first radio base station, a handover acknowledgment signal including a handover instruction signal; causing the first radio base station to generate RLC-PDU including PDCP-PDU containing the handover instruction signal, and to transmit the RLC-PDU to the second radio base station; and causing each of the first radio base station and the second radio base station to transmit to the mobile station, the RLC-PDU including the PDCP-PDU containing the handover instruction signal.

A fourth feature of the present invention is summarized as a radio base station operable as a first radio base station when a mobile station connected to a first cell under the first radio base station is subjected to a handover to a second cell under a second radio base station, including: a reception unit configured to acquire a handover acknowledgment signal including a handover instruction signal from the second radio base station; and a transmission unit configured to generate RLC-PDU including PDCP-PDU containing the handover instruction signal, and to transmit the RLC-PDU to the second radio base station. Here, the transmission unit is configured to transmit to the mobile station, the RLC-PDU including the PDCP-PDU containing the handover instruction signal.

DETAILED DESCRIPTION (Mobile Communication System. According to First Embodiment of Present Invention)

A mobile communication system according to a first embodiment of the present invention will be described with reference to FIG. 1 to FIG. 3.

Figure 1:
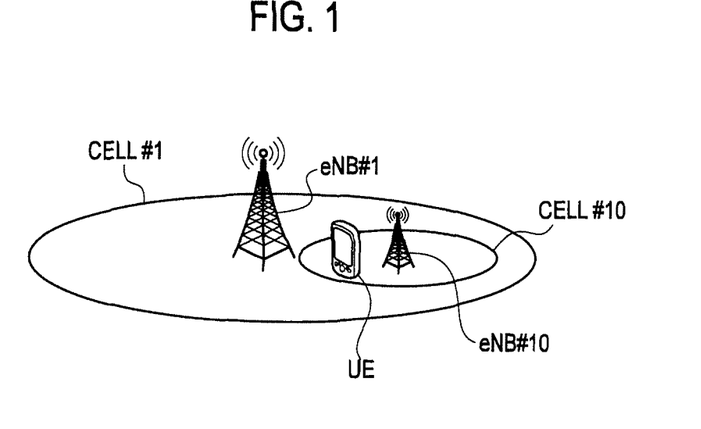
FIG. 1 is a view for explaining an overall configuration of a mobile communication system according to a first embodiment of the present invention.

As shown in FIG. 1, a mobile communication system of this embodiment includes a radio base station eNB #1 which manages a cell #1, and a radio base station eNB #10 which manages a cell #10.

An area covered by the cell #1 and an area covered by the cell #10 are designed to at least partially overlap each other geographically. Here, the cell #1 and the cell #10 are cells using the same frequency.

For example, the cell #1 may be a macro cell while the cell #10 may be a small cell such as a phantom cell.

Meanwhile, the mobile communication system of this embodiment is configured to be capable of carrying out CoMP on a downlink between the cell #1 under the radio base station eNB #1 and the cell #10 under the radio base station eNB #10 as well.

Note that this embodiment will be described on the assumption that a mobile station UE connected to the cell #1 performs a handover to the cell #10.

Figure 2:
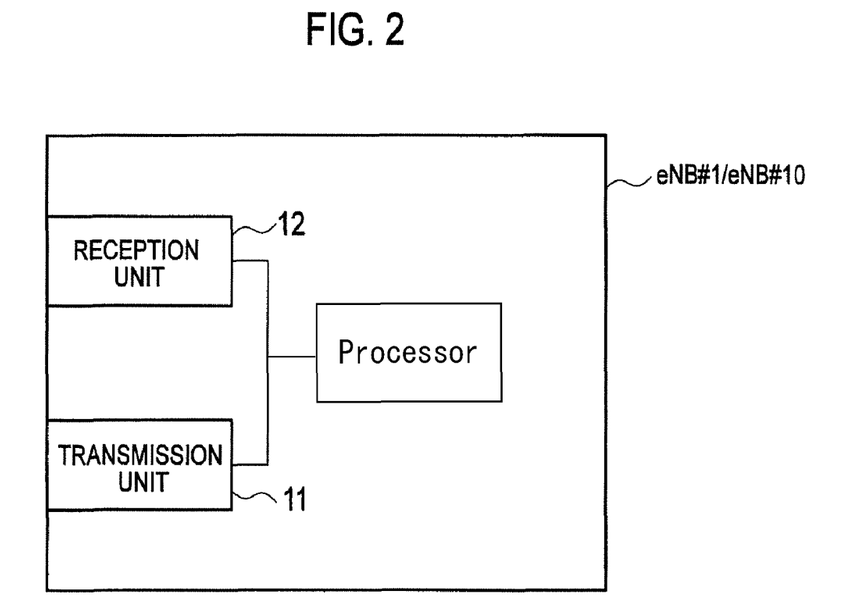
FIG. 2 is a functional block diagram of a radio base station eNB #1 or eNB #10 according to the first embodiment of the present invention.

As shown in FIG. 2, the radio base station eNB of this embodiment, namely, the radio base station eNB #1 or the radio base station eNB #10 of this embodiment includes a transmission unit 11 and a reception unit 12.

The transmission unit 11 of the radio base station eNB #1 is configured to transmit various signals to the mobile station UE and the radio base station eNB #10. The reception unit 12 of the radio base station eNB #1 is configured to receive various signals from the mobile station UE and the radio base station eNB #10.

Meanwhile, the transmission unit 11 of the radio base station eNB #10 is configured to transmit various signals to the mobile station UE and the radio base station eNB #1. The reception unit 12 of the radio base station eNB #10 is configured to receive various signals from the mobile station UE and the radio base station eNB #1.

For example, in a handover procedure of the mobile station UE from the cell #1 to the cell #10, the transmission unit 11 of the radio base station eNB #1 is configured to transmit to the radio base station eNB #10, information (hereinafter PDCP/RLC information) necessary for generating PDCP-PDU and RLC-PDU.

Here, in the aforementioned handover procedure, the transmission unit 11 of the radio base station eNB #1 is configured to transmit the above-mentioned PDCP/RLC information at a timing before "HO ack" is transmitted by the transmission unit 11 of the radio base station eNB #10.

Meanwhile, in the aforementioned handover procedure, the transmission unit 11 of the radio base station eNB #10 is configured to transmit the "HO ack" including "HO command" to the radio base station eNB #1.

Moreover, in the aforementioned handover procedure, the transmission unit 11 of the radio base station eNB #10 is configured to generate RLC-PDU including the PDCP-PDU, which contains the "HO command" included in the "HO ack" transmitted to the radio base station eNB #1, based on the above-mentioned PDCP/RLC information and to transmit the RLC-PDU to the mobile station UE.

Likewise, in the aforementioned handover procedure, the transmission unit 11 of the radio base station eNB #1 is configured to generate RLC-PDU including the PDCP-PDU, which contains the "HO command" included in the "HO ack" received from the radio base station eNB #10, based on the above-mentioned PDCP/RLC information and to transmit the RLC-PDU to the mobile station UE.

An operation of the mobile communication system of this embodiment will be described below with reference to FIG. 3. Specifically, a description will be given of an operation when the mobile station UE is subjected to a handover from the cell #1 to the cell #10 in the mobile communication system of this embodiment.

Figure 3:
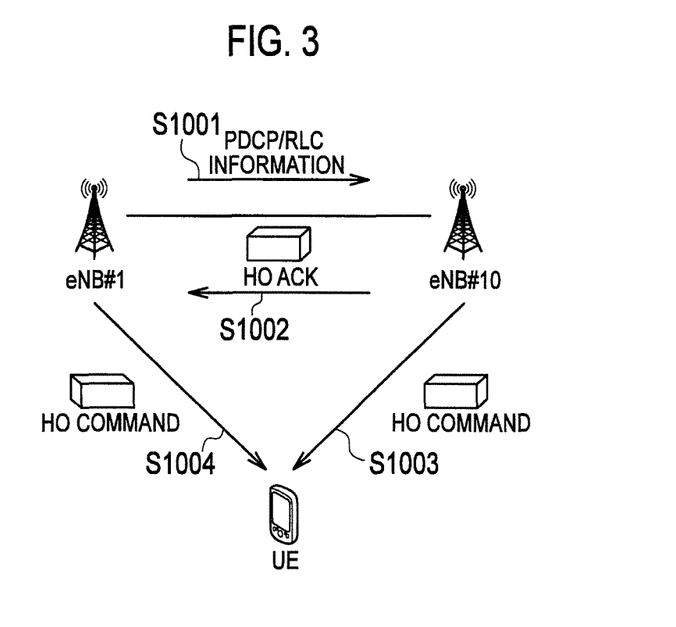
FIG. 3 is a diagram for explaining an operation of the mobile communication system according to the first embodiment of the present invention.

As shown in FIG. 3, in step S1001, the radio base station eNB #1 transmits the PDCP/RLC information to the radio base station eNB #10.

In step S1002, the radio base station eNB #10 transmits to the radio base station eNB #1, the "HO ack" which includes the "HO command".

In step S1003, the radio base station eNB #10 generates the RLC-PDU including the PDCP-PDU, which contains the "HO command" included in the "HO ack" transmitted to the radio base station eNB #1, based on the above-mentioned PDCP/RLC information, and the radio base station eNB #10 transmits the RLC-PDD to the mobile station UE.

In step S1004, the radio base station eNB #1 generates the RLC-PDU including the PDCP-PDU, which contains the "HO command" included in the "HO ack" received from the radio base station eNB #10, based on the above-mentioned PDCP/RLC information, and the radio base station eNB #1 transmits the RLC-PDU to the mobile station UE.

As a consequence, the RLC-PDU generated by the radio base station eNB #1, which includes the PDCP-PDU containing the "HO command", is identical to the RLC-PDU generated by the radio base station eNB #10, which includes the PDCP-PDU containing the "HO command". Accordingly, it is possible to implement the "RRC diversity" in the handover procedure between the cells #1 and #10 under the different radio base stations eNB #1 and eNB #10 while considering conditions of a PDCP layer and an RLC layer.

First Modified Example

A mobile communication system according to a first modified example of the present invention will be described below with reference to FIG. 4 while focusing on different features from those of the mobile communication system according to the above-mentioned the first embodiment.

The transmission unit 11 of the radio base station eNB #1 is configured to generate the RLC-PDU including the PDCP-PDU, which contains the "HO command" received from the radio base station eNB #10, and to transmit the RLC-PDU to the radio base station eNB #10.

Meanwhile, the transmission unit 11 of the radio base station eNB #10 is configured to transmit to the mobile station UE, the RLC-PDU including the PDCP-PDU, which contains the "HO command" received from the radio base station eNB #1.

An operation of the mobile communication system of the first modified example will be described below with reference to FIG. 4. Specifically, a description will be given of an operation when the mobile station UE is subjected to a handover from the cell #1 to the cell #10 in the mobile communication system of the first modified example.

Figure 4:
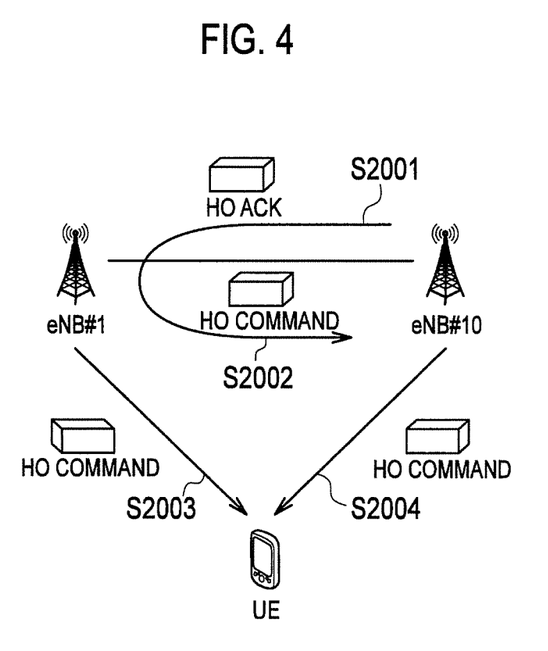
FIG. 4 is a diagram for explaining an operation of a mobile communication system according to a first modified example of the present invention.

As shown in FIG. 4, in step S2001, the radio base station eNB #10 transmits to the radio base station eNB #1, the "HO ack" which includes the "HO command".

In step S2002, the radio base station eNB #1 generates the RLC-PDU including the PDCP-PDU, which contains the "HO command" included in the "HO ack", and transmits the RLC-PDU to the radio base station eNB #10.

In step S2003, the radio base station eNB #1 transmits to the mobile station UE, the RLC-PDU including the PDCP-PDU that contains the "HO command".

In step S2004, the radio base station eNB #10 transmits to the mobile station UE, the RLC-PDU including the PDCP-PDU, which contains the "HO command" received from the radio base station eNB #1.

As a consequence, the RLC-PDU generated by the radio base station eNB #1, which includes the PDCP-PDU containing the "HO command", is identical to the RLC-PDU generated by the radio base station eNB #10, which includes the PDCP-PDU containing the "HO command". Accordingly, it is possible to implement the "RRC diversity" in the handover procedure between the cells #1 and #10 under the different radio base stations eNB #1 and eNB #10, while considering conditions of the PDCP layer and the RLC layer.

In the RLC layer, the RLC-PDU is generated based on radio quality of the cell (namely, a transport block size calculated from the radio quality of the cell). Here, the radio base station eNB #1 may generate the RLC-PDU by estimating the radio quality of the cell #10 under the radio base station eNB #10 when the radio base station eNB #1 generates the RLC-PDU including the PDCP-PDU that contains the "HO command".

Further more, in this case, if the radio quality of the cell #10 under the radio base station eNB #10 is worse than the radio quality estimated by the radio base station eNB #1 (i.e., if the actual transport block size is smaller), then the radio base station eNB #10 may re-segment the RLC-PDU.

The features of the present embodiment may also be expressed as follows.

A first feature of the present embodiment is summarized as a handover method of performing a handover of a mobile station UE connected to a cell #1 (first cell) under a radio base station eNB#1 (first radio base station) to a cell #10 (second cell) under a radio base station eNB#10 (second radio base station), including the steps of: causing the radio base station eNB#1 to transmit to the radio base station eNB#10, PDCP/RLC information necessary for generating PDCP-PDU and RLC-PDU; causing the radio base station eNB#10 to transmit to the radio base station eNB#1, "HO ack (handover acknowledgment signal) " including "HO command"; and causing each of the radio base station eNB#1 and the radio base station eNB#10 to generate the RLC-PDU including the PDCP-PDU containing the "HO command" based on the PDCP/RLC information, and to transmit the RLC-PDU to the mobile station UE.

According to the above-described aspect, the RLC-PDU generated by the radio base station eNB #1, which includes the PDCP-PDU containing the "HO command", is identical to the RLC-PDU generated by the radio base station eNB #10, which includes the PDCP-PDU containing the "HO command". Accordingly, it is possible to implement the "RRC diversity" in the handover procedure between the cells #1 and #10 under the different radio base stations eNB #1 and eNB #10, while considering the conditions of the PDCP layer and the RLC layer.

A second feature of the present embodiment is summarized as a radio base station eNB operable as a radio base station eNB#10 when a mobile station UE connected to a cell #1 under a radio base station eNB#1 is subjected to a handover to a cell #10 under the radio base station eNB#10, including: a reception unit 12 configured to acquire PDCP/RLC information from the radio base station eNB#1; and a transmission unit 11 configured to generate the RLC-PDU including the PDCP-PDU containing "HO command" based on the PDCP/RLC information, and to transmit the RLC-PDU to the mobile station UE.

According to the above-described aspect, the RLC-PDU generated by the radio base station eNB #1, which includes the PDCP-PDU containing the "HO command", is identical to the RLC-PDU generated by the radio base station eNB #10, which includes the PDCP-PDU containing the "HO command". Accordingly, it is possible to implement the "RRC diversity" in the handover procedure between the cells #1 and #10 under the different radio base stations eNB #1 and eNB #10, while considering the conditions of the PDCP layer and the RLC layer.

In the first or second feature of the present embodiment, the information may include: a security key; a COUNT value; and RLC-SN (RLC sequence number).

According to the above-described feature, the radio base station eNB #1 and the radio base station eNB #10 can use the same security key, the same COUNT value, and the same RLC-SN, and thus generate the same RLC-PDU, which includes the PDCP-PDU containing the "HO command".

A third feature of the present embodiment is summarized as a mobile communication method to be performed when a mobile station UE connected to a cell #1 under a radio base station eNB#1 is subjected to a handover to a cell #10 under a radio base station eNB#10, including the steps of: causing the radio base station eNB#10 to transmit to the radio base station eNB#1, "HO ack" including "HO command"; causing the radio base station eNB#1 to generate RLC-PDU including PDCP-PDU containing the "HO command", and to transmit the RLC-PDU to the radio base station eNB#10; and causing each of the radio base station eNB#1 and the radio base station eNB#10 to transmit to the mobile station UE, the RLC-PDU including the PDCP-PDU containing the "HO command".

According to the above-described aspect, the RLC-PDU generated by the radio base station eNB #1, which includes the PDCP-PDU containing the "HO command", is identical to the RLC-PDU generated by the radio base station eNB #10, which includes the PDCP-PDU containing the "HO command".

Accordingly, it is possible to implement the "RRC diversity" in the handover procedure between the cells #1 and #10 under the different radio base stations eNB #1 and eNB #10, while considering the conditions of the PDCP layer and the RLC layer.

A fourth feature of the present embodiment is summarized as a radio base station eNB operable as a radio base station eNB#1 when a mobile station UE connected to a cell #1 under the radio base station eNB#1 is subjected to a handover to a cell #10 under a radio base station eNB#10, including: a reception unit 12 configured to acquire "HO ack" including "HO command" from the radio base station eNB#10; and a transmission unit 11 configured to generate RLC-PDU including PDCP-PDU containing the "HO command", and to transmit the RLC-PDU to the radio base station eNB#10. Here, the transmission unit 11 is configured to transmit to the mobile station UE, the RLC-PDU including the PDCP-PDU containing the "HO command".

According to the above-described aspect, the RLC-PDU generated by the radio base station eNB #1, which includes the PDCP-PDU containing the "HO command", is identical to the RLC-PDU generated by the radio base station eNB #10, which includes the PDCP-PDU containing the "HO command". Accordingly, it is possible to implement the "RRC diversity" in the handover procedure between the cells #1 and #10 under the different radio base stations eNB #1 and eNB #10, while considering the conditions of the PDCP layer and the RLC layer.

It should be noted that the foregoing operations of the mobile station UE and the radio base stations eNB#1 and eNB#10 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base stations eNB#1 and eNB#10. Otherwise, the storage medium and the processor may be provided as discrete components inside the mobile station UE and the radio base stations eNB#1 and eNB#10.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-099358 (filed on May 9, 2013) is incorporated by reference in the present specification.

INDUSTRIAL APPLICABILITY

As described above, according to the present invention, it is possible to provide a handover method and a radio base station, which are capable of implementing "RRC diversity" in a handover procedure between cells under different radio base stations eNB, while considering conditions of a PDCP layer and an RLC layer.

EXPLANATION OF THE REFERENCE NUMERALS eNB #1/eNB #10 radio base station
UE mobile station
11 transmission unit
12 reception unit

The invention claimed is:

1. A handover method of performing a handover of a mobile station connected to a first cell under a first radio base station, to a second cell under a second radio base station, comprising the steps of:
    causing the first radio base station to transmit to the second radio base station, information necessary for generating PDCP-PDU and RLC-PDU;
    causing the second radio base station to transmit to the first radio base station, a handover acknowledgment signal including a handover instruction signal; and
    causing the first radio base station and the second radio base station to generate the same RLC-PDU including the same PDCP-PDU containing the handover instruction signal based on the information, and to transmit the same RLC-PDU to the mobile station,
    wherein the information includes:
        a security key;
        a COUNT value; and
        a Radio Link Control (RLC) sequence number, and
    wherein the security key, the COUNT value, and the RLC sequence number are the same for both the first radio base station and the second radio base station.

2. A radio base station operable as a second radio base station when a mobile station connected to a first cell under a first radio base station is subjected to a handover to a second cell under the second radio base station, comprising:
    a receiver that acquires information necessary for generating PDCP-PDU and RLC-PDU from the first radio base station;
    a processor that generates the RLC-PDU including the PDCP-PDU containing a handover instruction signal based on the information; and
    a transmitter that transmits the RLC-PDU to the mobile station,
    wherein the information includes:
        a security key;
        a COUNT value; and
        a Radio Link Control (RLC) sequence number, and
    wherein the security key, the COUNT value, and the RLC sequence number are the same for both the first radio base station and the second radio base station.

* * * * *